United States Patent
Kujirai

(10) Patent No.: US 7,505,910 B2
(45) Date of Patent: Mar. 17, 2009

(54) SPEECH COMMAND MANAGEMENT DEPENDENT UPON APPLICATION SOFTWARE STATUS

(75) Inventor: Toshihiro Kujirai, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 781 days.

(21) Appl. No.: 10/765,913

(22) Filed: Jan. 29, 2004

(65) Prior Publication Data

US 2004/0260562 A1    Dec. 23, 2004

(30) Foreign Application Priority Data

Jan. 30, 2003    (JP)    ............... 2003-021298

(51) Int. Cl.
*G10L 21/00*    (2006.01)
*G10L 11/00*    (2006.01)

(52) U.S. Cl. .................... 704/275; 704/270.1

(58) Field of Classification Search ............. 704/270, 704/270.1, 231, 257, 275
See application file for complete search history.

(56) References Cited

U.S. PATENT DOCUMENTS

| 5,632,002 A | | 5/1997 | Hashimoto et al. | |
| 6,708,150 B1 | * | 3/2004 | Hirayama et al. | ........... 704/243 |
| 7,016,849 B2 | * | 3/2006 | Arnold et al. | ............... 704/275 |
| 7,117,159 B1 | * | 10/2006 | Packingham et al. | ........ 704/275 |
| 7,139,709 B2 | * | 11/2006 | Schmid et al. | .............. 704/258 |
| 7,139,713 B2 | * | 11/2006 | Falcon et al. | ................ 704/275 |
| 7,188,066 B2 | * | 3/2007 | Falcon et al. | ................ 704/275 |

FOREIGN PATENT DOCUMENTS

| JP | 2001-056694 | 5/1995 |
| JP | 07-140998 | 6/1995 |
| JP | 10-222337 | 8/1998 |
| JP | 2002-149181 | 5/2002 |
| JP | 2002-259114 | 9/2002 |

* cited by examiner

*Primary Examiner*—Michael N Opsasnick
(74) *Attorney, Agent, or Firm*—Antonelli, Terry, Stout & Kraus, LLP.

(57) ABSTRACT

Arrangements, including a method of speech command management that changes a content of active speech commands and inactive speech commands, based on each application status in a terminal. When plural applications are active and when a user is interacting with one of the active applications, the provided speech command management makes the content of recognizable speech commands to be limited to local commands of an interacting application, and also global commands of other background applications. Also, the provided management arrangement makes the content of recognizable global speech commands based on each application status. This management arrangement reduces the number of recognizable speech commands, and thus prevents misrecognitions inducted by using many speech commands.

20 Claims, 14 Drawing Sheets

CUSTOMIZATION ・・・ AUDIO
EDIT COMMANDS

| COMMAND | ACTIVATING | EXECUTING | INTERACTING |
|---|---|---|---|
| MUSIC SELECTION | OFF | ON | ON |
| PLAY MUSIC IN SHUFFLED ORDER | OFF | ON | OFF |
| MUTE | OFF | OFF | OFF |

( DECIDE )  FOR CHANGE          [ NEXT ]

| ID | COMMAND | CORRESPONDING APPLICATION ID | STATE | VALID/ INVALID |
|---|---|---|---|---|
| 1 | VOLUME UP | 8 | ACTIVATED | VALID |
| 2 | tmp0121.srgf | 3 | INTERACTING | INVALID |
| 3 | TOP MENU | 0 | INSTALLED; ACTIVATED; INTERACTING | VALID |
| 4 | SEARCH SURROUNDING INFORMATION | 2,5 | ACTIVATED | VALID |

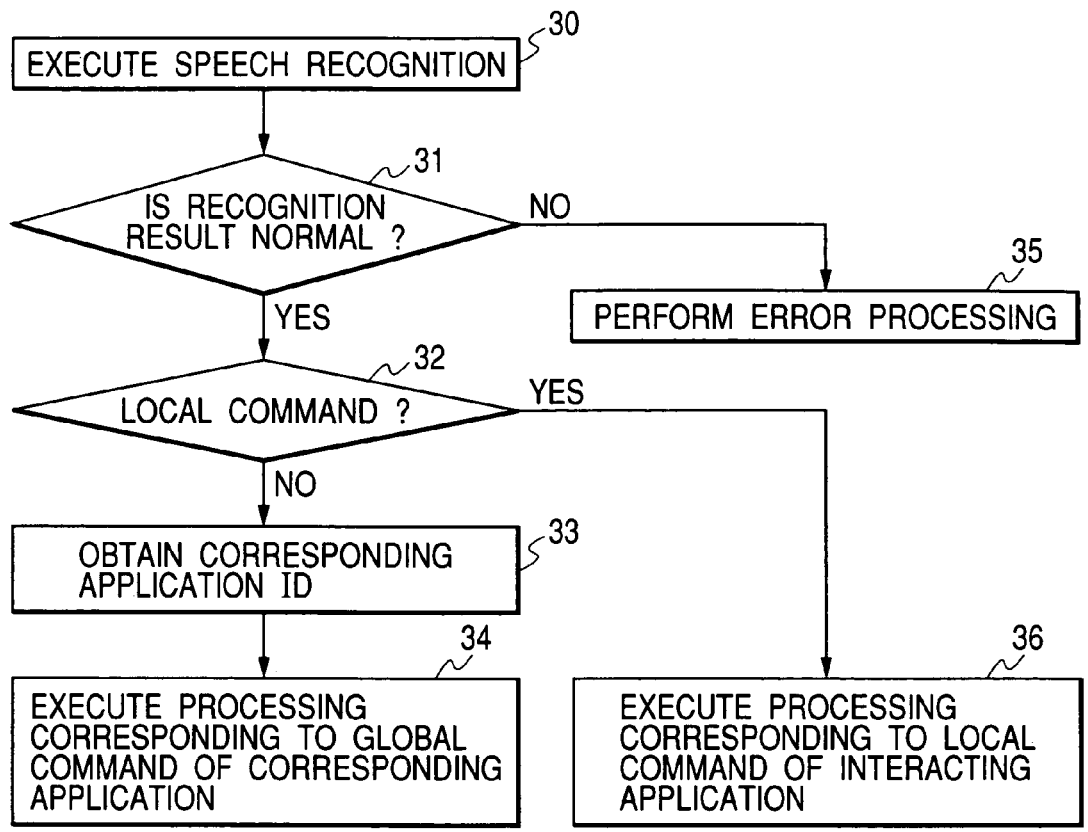

| ID | COMMAND | CORRESPONDING APPLICATION ID | STATE | CUSTOMIZATION | VALID/ INVALID |
|---|---|---|---|---|---|
| 1 | VOLUME UP | 8 | ACTIVATED | DEFAULT | VALID |
| 2 | tmp0121.srgf | 3 | INTERACTING | INVALID | INVALID |
| 3 | TOP MENU | 0 | INSTALLED; ACTIVATED; INTERACTING | DEFAULT | VALID |
| 4 | SEARCH SURROUNDING INFORMATION | 2,5 | ACTIVATED | DEFAULT | VALID |

FIG. 14

| COMMAND NAME | FUNCTION |
|---|---|
| VOLUME UP | VOLUME (1) |
| VOLUME DOWN | VOLUME (−1) |
| SELECT | DIALOG (SELECT) |

FIG. 15

| COMMAND NAME | FUNCTION | PRIORITY |
|---|---|---|
| VOLUME UP | VOLUME (1) | LOW |
| VOLUME DOWN | VOLUME (−1) | LOW |
| SELECT | DIALOG (SELECT) | HIGH |

FIG. 18

| APPLICATION | RECOGNITION COMMAND |
|---|---|
| NAVIGATION APPLICATION | SETTING DESTINATION |
| NAVIGATION APPLICATION | SCALE UP |
| NAVIGATION APPLICATION | SCALE DOWN |
| NAVIGATION APPLICATION | NORTH UP |
| NAVIGATION APPLICATION | HEAD UP |
| NAVIGATION APPLICATION | MENU |
| NAVIGATION APPLICATION | END |
| TRAFFIC INFORMATION | ACTIVATING TRAFFIC INFORMATION APPLICATION |
| MUSIC | VOLUME UP |
| MUSIC | VOLUME DOWN |
| MUSIC | RADIO |
| MUSIC | MUSIC SELECTION |

| STATE | RECOGNITION COMMAND |
|---|---|
| AT THE TIME OF INSTALLATION | ACTIVATING NAVIGATION |
| AT THE TIME OF ACTIVATION | SETTING DESTINATION |
| AT THE TIME OF ACTIVATION | SCALE UP |
| AT THE TIME OF ACTIVATION | SCALE DOWN |
| AT THE TIME OF INTERACTION | SETTING DESTINATION |
| AT THE TIME OF INTERACTION | SCALE UP |
| AT THE TIME OF INTERACTION | SCALE DOWN |
| AT THE TIME OF INTERACTION | NORTH UP |
| AT THE TIME OF INTERACTION | HEAD UP |
| AT THE TIME OF INTERACTION | MENU |
| AT THE TIME OF INTERACTION | END |

192

| STATE | RECOGNITION COMMAND |
|---|---|
| AT THE TIME OF INSTALLATION | ACTIVATING TRAFFIC INFORMATION |
| AT THE TIME OF ACTIVATION | TRAFFIC INFORMATION |
| AT THE TIME OF ACTIVATION | ACCIDENT INFORMATION |
| AT THE TIME OF ACTIVATION | ARRIVAL TIME PREDICTION |
| AT THE TIME OF INTERACTION | TRAFFIC INFORMATION |
| AT THE TIME OF INTERACTION | ACCIDENT INFORMATION |
| AT THE TIME OF INTERACTION | ARRIVAL TIME PREDICTION |
| AT THE TIME OF INTERACTION | TRAFFIC TIME |
| AT THE TIME OF INTERACTION | BYPATH INFORMATION |
| AT THE TIME OF INTERACTION | MENU |
| AT THE TIME OF INTERACTION | END |

193

| STATE | RECOGNITION COMMAND |
|---|---|
| AT THE TIME OF INSTALLATION | ACTIVATING PLAYER |
| AT THE TIME OF ACTIVATION | VOLUME UP |
| AT THE TIME OF ACTIVATION | VOLUME DOWN |
| AT THE TIME OF ACTIVATION | RADIO |
| AT THE TIME OF ACTIVATION | MUSIC SELECTION |
| AT THE TIME OF INTERACTION | VOLUME UP |
| AT THE TIME OF INTERACTION | VOLUME DOWN |
| AT THE TIME OF INTERACTION | RADIO |
| AT THE TIME OF INTERACTION | MUSIC SELECTION |
| AT THE TIME OF INTERACTION | CHANGING ALBUM |
| AT THE TIME OF INTERACTION | FIRST PIECE OF MUSIC |
| AT THE TIME OF INTERACTION | SECOND PIECE OF MUSIC |

SPEECH COMMAND MANAGEMENT DEPENDENT UPON APPLICATION SOFTWARE STATUS

FIELD OF THE INVENTION

The present invention relates to a speech interaction arrangement (terminals, methods, implementations) for helping control simultaneous execution of a plurality of applications.

BACKGROUND

When a plurality of applications exist in one system, the applications may be able to be simultaneously executed. However from the viewpoint of a user, the number of the applications the user can simultaneously execute may be extremely small, in most cases, one. Particularly when operations by speech interaction are executed, the number of applications simultaneously interacting with the user is preferably limited to one.

On the other hand, when the user desires to operate an application other than the application currently interacting with the user, the user in a speech interactive system may speak a global command corresponding to a user-desired application. Then the system transfers to a state of interaction between the user and the user-desired application, and to a state of execution of a specific function. It is therefore important for the user's satisfaction that the user is able to directly operate the user-desired application by means of speech without using a textual menu each time to select the user-desired application.

One background interaction type user interface unit detects that a content of a user's speech corresponds to an application other than one being currently executed, and executes the speech interaction application corresponding to the speech content instead of the currently interacting one. (for example, see JP-A No. 56694/2001).

Car navigation systems may be sold by their manufacturers in the form that all programs to be executed in the system are previously installed in the system. In this case, all applications are known to the manufacturer, and thus any state of the system could be anticipated and adjusted to execute normal interaction.

Current speech recognition systems (e.g. car navigation system)are not perfect, for example, a recognition ratio may be decrease as the number of commands to be recognized is increased. As one example, when terminal functions are advanced and more applications are installed, the number of the commands to be managed is greatly increased. Then, the increased command vocabulary may lowers the recognition ratio.

Car navigation systems where applications can be installed from the Internet via mobile phones are possible. In this case, which types of applications that are installed within a system at any given time may not be assumed. Therefore, global commands to be recognized cannot be optimally set according to all the possible states of the navigation system by previously counting the states, for example, the number of the commands to be managed cannot be decreased by adjusting the applications.

BRIEF DESCRIPTION OF THE DRAWINGS

FIG. 3 is an example flowchart explaining one example embodiment of processing a result of speech recognition;

FIG. 4 explains one example embodiment of a management table of global commands;

FIG. 14 explains one example embodiment of the information contained in an application;

FIG. 15 explains another example embodiment of the information contained in an application;

FIG. 18 explains one example embodiment of a global command list of a car navigation system;

FIG. 19 explains one example embodiment of a global command list of each application.

DETAILED DESCRIPTION

Figures 1, 2:
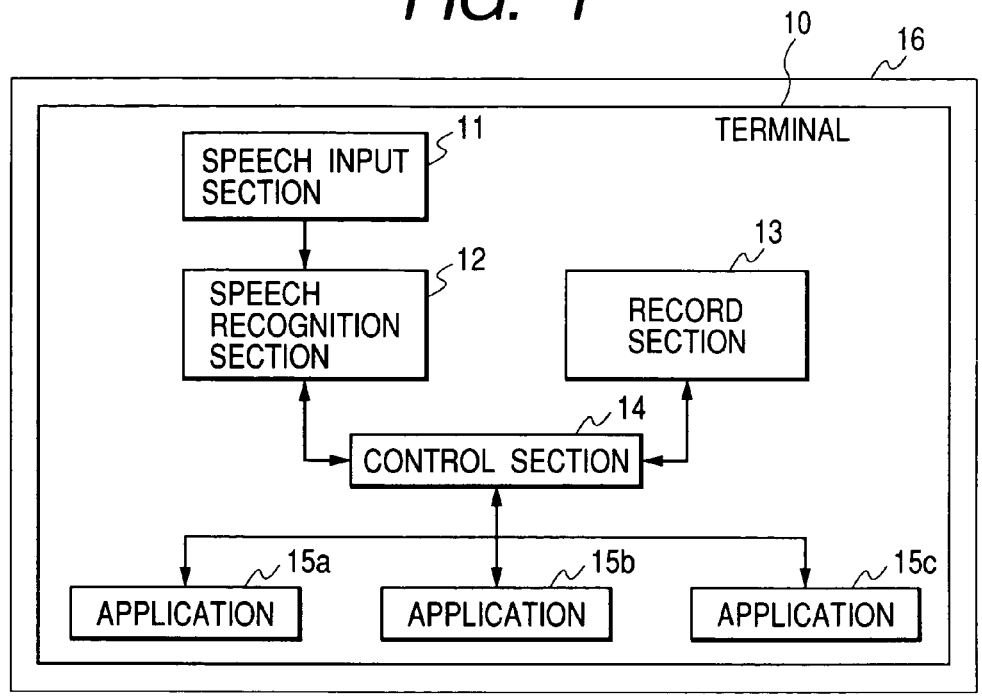
FIG. 1 is a block diagram explaining one example embodiment of an interaction type terminal.
FIG. 2 explains one example embodiment of a management table of global commands.

Before beginning a detailed description of the subject invention, mention of the following is in order. When appropriate, like reference numerals and characters may be used to designate identical, corresponding or similar components in differing figure drawings. As manufacturing techniques mature over time, it is expected that devices, apparatus, etc., of smaller size, improved quality, additional feature etc. could be manufactured. With regard to description of any flowchart it might possible to change an order of steps. As a final note, well known components for system (e.g. car navigation) may not be shown within the FIGS. for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. In other instances, detailed descriptions of well-known methods and components are omitted so as not to obscure the description of the invention with unnecessary/excessive detail. Where specific details (e.g., systems, flowcharts) are set forth in order to describe example embodiments of the invention, it should be apparent to one skilled in the art that the invention can be practiced without, or with variation of, these specific details. Finally, it should be apparent that differing combinations of hard-wired circuitry and software instructions can be used to implement embodiments of the present invention, i.e., the present invention is not limited to any specific combination of hardware and software.

Although main example embodiments of the present invention will be described using an example system block diagram in an example terminal environment, practice of the invention is not limited thereto, i.e., the invention may be able to be practiced with other types of electronic devices (e.g., personal computers, servers) and/or systems (mainframes), and in other types of environments (e.g., networks).

Example embodiments of the present invention disclosed herein are explained in detail below, although practice of present invention is not limited to such example embodiments.

Global commands are used for making an application currently interacting with a user, and applications other than the currently-interacting application, to execute some predetermined operation. When the user desires to operate an application not currently interacting with the user, the user speaks a command corresponding to the user-desired application, so that, for example, a state of a system can be transferred to interaction between the user and the application. As required, the global commands may mean internal expressions in a terminal and a server of the commands.

Next, example embodiments of the present invention are explained with reference to the drawings.

FIG. 1 is one example embodiment of an interaction type terminal. A terminal 10 comprises a speech input unit 11, a speech recognition engine 12, a memory 13, a control unit 14, and one or more applications 15a to 15c.

The terminal may be installed as part of a system shown representatively by a block 16. For example block may represent a vehicle, a portable computer and a room, etc. Although the present invention is not limited thereto, the following discussions may use installation within a vehicle system (e.g. car) as an example for discussion.

The speech input unit 11 is, for example, a microphone attached to a sun visor of an automobile. The speech recognition engine 12 recognizes both global commands recorded in the memory 13 and specified by the control unit 14, and also local commands required for interaction between the application 15 and the user.

The control unit 14 receives a result of the speech recognition, and provides control to execute the application 15 corresponding to the global command. To make the global commands correspond to the applications 15, ID information for identifying the applications 15a to 15c may be associated with the respective global commands. The control unit 14, according to change of a state of each application 15, may specify any one of global commands to be recognizable by the speech recognition engine 12. In FIG. 1 the control unit 14 instructs the speech recognition unit 12 directly, but it may be possible to instruct the speech recognition unit 12 through record unit 13.

Figure 13:
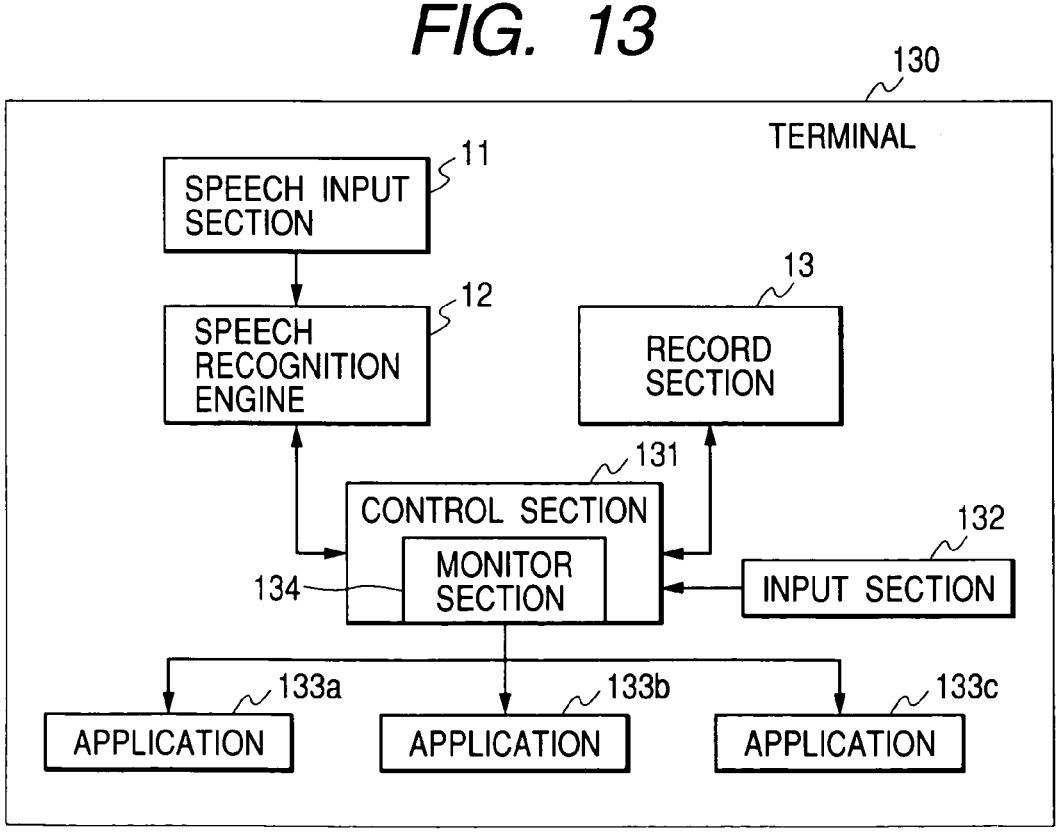
FIG. 13 is another example block diagram explaining another example embodiment of an interaction type terminal.

By receiving, from the applications, reports about change of states of their operations, the control unit may monitor the states of the applications, and adjust a list of recognizable commands accordingly. Or as shown in FIG. 13, a discrete monitor unit 134 may be provided to monitor applications 133($a,b,c$). When states of operations of the applications 133 change, the monitor unit 134 may report the change to the control unit 131. With such a configuration, the applications 133 do not need to have a system to report states to the control unit 14.

The global command management used by the control unit may be as follows. For example, the record unit 13 may record and manage a table such as shown in, for example, FIG. 2, where each global command may have stored there with a corresponding application ID, application states in which the global commands become valid, a flag representing whether the global commands are presently valid, and so on. When each of the applications 15 is activated, stopped, or has the right to preferentially interact with the user, it may report its states to the control unit 14, which may rewrite appropriate flags.

For example, when an application is not operating, a name of the application may become valid as a global command for activation of the application. After the activation, a plurality of operation commands may become valid (active) to achieve more concrete operations, and the name of the application which has previously been become valid may become invalid (inactive i.e. presently unrecognizable) as a global command.

There may be many example states of operations of each application. For example, the states that the application is installed but not activated; that the application is activated but not interacting with the user; and, that the application is interacting with the user. Depending on the states, required global commands may be greatly different, and these states may be universal among applications regardless of a type of application. Therefore, the global commands may be managed according to change of such operation states.

The global commands may be described using SRGF (Speech Recognition Grammar Format), which is standard as a grammar for speech recognition. In this case, direct grammar description, or the name of a file in which grammar description is made, may be described.

FIG. 3 is an example control flow of this terminal. After speech recognition (30), it is checked whether a result of the speech recognition is normal (31). When the result is not normal, error processing is performed (35). As an example embodiment of error processing, a guidance prompting the user to speak may be outputted to return to the process 30 again. When the result is normal, it is judged whether the result matches a local command which is an interaction command corresponding to a currently-interacting application (32). When the result matches a local command, the process corresponding to the local command is processed for a currently-interacting application (36). When the result does not match a local command, the result may be judged as a global command, and a table as shown in FIG. 2 is referenced to obtain IDs of all applications corresponding to the global command (33). Then, the applications corresponding to the obtained IDs are instructed to execute processes corresponding to the recognized global command (34).

Through such a flow, when there is the same command in both the local commands and global commands, the local command may be preferentially executed. As a result, when an interaction command corresponding to a currently-interacting application is the same as a global command of a different application, interaction with the currently-interacting application can be continued without spoiling a flow of the interaction.

To execute an actual process for a global command spoken by the user, process information is required for each global command. Information representing functions corresponding to the global commands may be stored, for example, in the memory 13, or in the applications 15. A table as shown in FIG. 14 may be added to each application 15, where a current state of each application 15 and the information representing functions corresponding to commands spoken by the user can be recorded.

In the above-described configuration, the control unit may transmit an execution instruction to an application corresponding to an inputted global command, so that a corresponding appropriate process is executed.

Since the number of possible states of each application is smaller than that of the whole system, the management of global commands may be efficient by corresponding the states of each application to the global commands to be recognized. Changing global commands recognizable according to the states of the applications may decrease the number of commands to be recognized at a time. As a result, an amount of the processes can be decreased, and a command not required by the situation is prevented from being wrongly recognized and executed.

The correspondence between the global commands and applications 15 may not be limited to one-to-one correspondence. More particularly one application 15 can correspond to a plurality of global commands. One global command can correspond to a plurality of applications 15, so as to execute simultaneously a plurality of the applications 15 in response to one speech by the user. In an example shown in FIG. 2, a command "search surrounding information" corresponds to applications 15 having IDs 2 and 5.

As described-above, the applications 15 may include a table such as shown in FIG. 14, so that each application 15 may execute a different function even when one global command corresponds to a plurality of the applications 15. For example, when a global command "setting destination" is spoken, and when the command corresponds to a destination setting application and traffic information application, the destination setting application may start to interact with the user, and the traffic information application may obtain surrounding traffic information to be on standby.

Even when different applications have the same global command, if the global command corresponds to the state of a currently-interacting application, only the application 15 currently interacting with the user may execute a process required by the user. For example in FIG. 4, a command "help" corresponds to application IDs 1 and 3. However, only the application 15 having the ID 1 is currently interacting, i.e. only a flag of a global command corresponding to the ID 1 is valid. Therefore, when the user speaks "help", a help process of the application 15 having the ID 1 is executed.

With the above-described method, an application not required by the user may be prevented from being executed because of a collision of global commands such as "menu" and "help", generally used in applications.

Another example method for avoiding such collision is as follows. In the case that the user speaks a global command shared by a plurality of applications, it may be predetermined which application executes a process corresponding to the command. A criterion for determining the application to be executed is such that the applications are prioritized to execute a highest prioritized application. In this case, the priority order does not necessarily need to be fixed, e.g., maybe dynamic and change over time. For example the application currently interacting with the user may be prioritized higher, or an application presently displaying a button on a screen corresponding to the global command may be prioritized higher.

Instead of a dynamic method for assigning priorities to protect against collision, a database where all global commands of all applications are registered may be provided to a server to help recognize and avoid collision. When a new application is added, it may be checked whether its global commands collide with the other registered global commands. Also to avoid the situation that a general command (such as "menu") is used for only one application, a registrant may be warned about the collision to voluntarily change a name of the command at the time when the collision becomes a problem. In such a method, the warning may be given not only when the global commands perfectly match, but also when there may be a global command having a pronunciation which is similar to those of other global commands and which may thereby tend to be wrongly recognized. To judge a pronunciation similarity, the method of calculating a distance of Roman alphabets with which each global command is described by Dynamic Programming and a penalty of replacement, elimination, and insertion of each alphabet is added, may be adopted.

In the configuration of the present invention, not only local commands but also global commands may be used for a currently-interacting application. The currently-interacting application 15 may preferably prompt the next speech of the user, for example, by providing a guidance to the user(e.g. by presenting command choices by synthesized speech). And the local commands may then be used to preferably to recognize the prompted speech by the user. On the other hand, regardless of the prompt, the user may call a help function when puzzled about the operation. The local commands constantly change according to a flow of interaction, but global commands, unrelated to flow of the interaction, may not frequently change. So it may be efficient that a help command may be managed as a global command.

As described above, the example embodiments of the present invention may provide an interaction type terminal for managing global commands according to states of a plurality of applications in a system.

Figure 5:
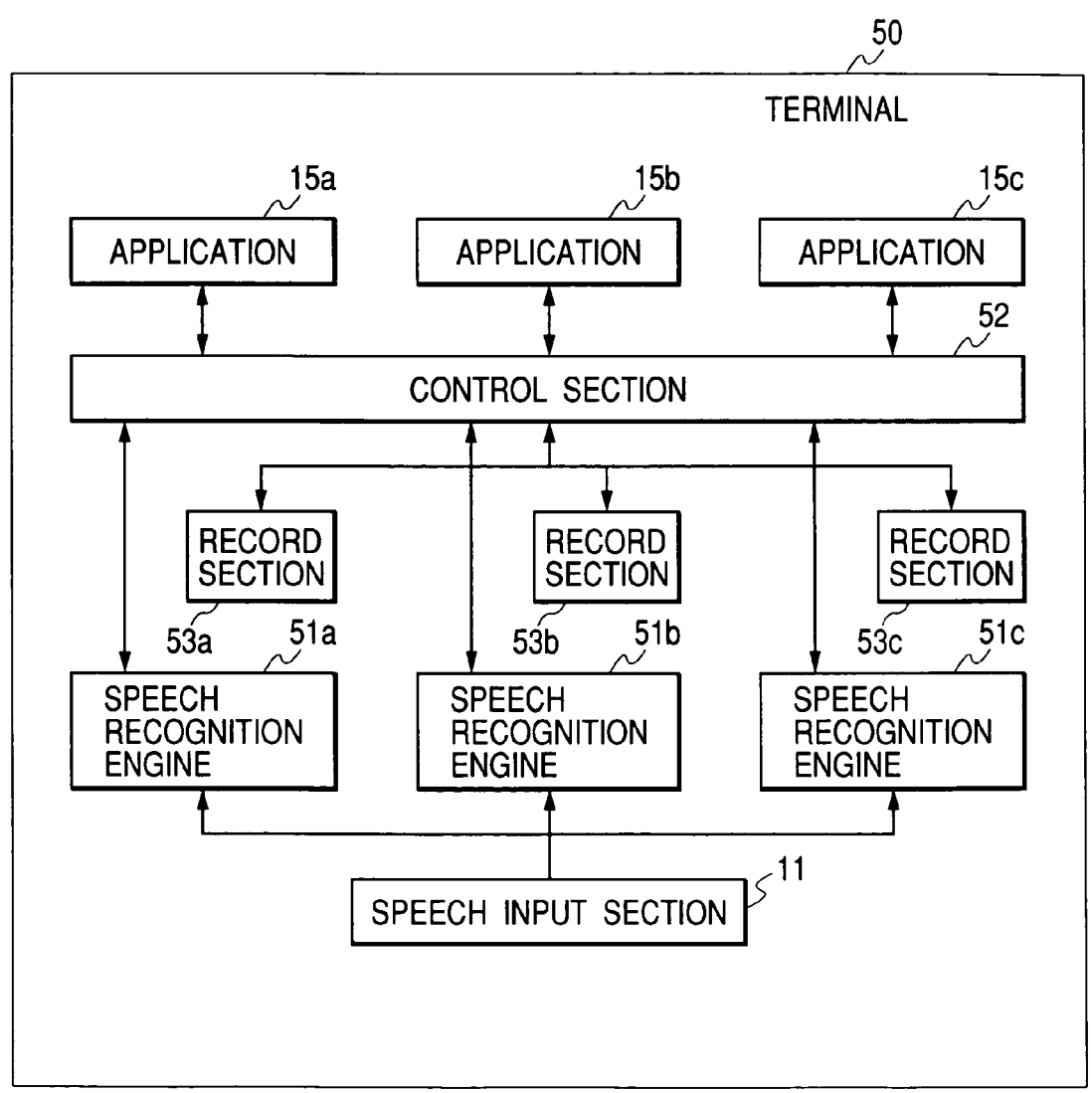
FIG. 5 is a block diagram explaining one example embodiment of an interaction type terminal.

In the above-described embodiments, only one memory 13 for recording global commands and only one speech recognition engine 12 exist in the system. The present invention is not limited to such a configuration. For example, a terminal 50 of FIG. 5 may include a plurality of speech recognition engines 51(a,b,c) and memories 53(a,b,c), which may correspond to the applications 15. In this case, a control unit 52 may receive a plurality of results of the recognition. The speech recognition engines 51 may add score information to the results of the recognition to decide which result of the recognition is used by the control unit 52.

With such a configuration, the recognition engines 51 may be respectively specialized to types of global commands to be recognized, thereby increasing the process efficiency and recognition ratio. For example, the recognition engine 51a may recognize continuous words, the recognition engine 51b may recognize continuous numbers, and the recognition engine 51c may recognize geographic names.

Figure 6:
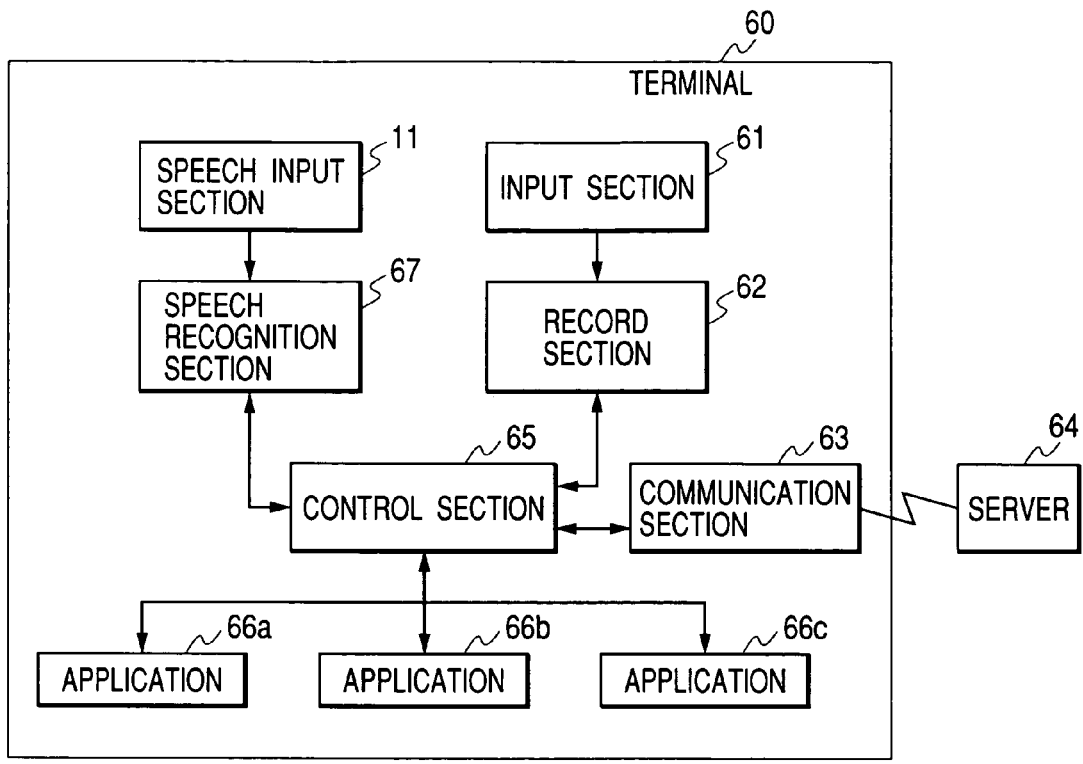
FIG. 6 is a block diagram explaining one example embodiment of an interaction type terminal.

FIG. 6 shows another example embodiment of the interaction type terminal. A terminal 60 may include the speech input unit 11, a speech recognition 67, an input unit 61, a memory 62, a communication unit 63, a control unit 65, and one or more applications 66(a,b,c).

In an embodiment of FIG. 6, compared to the embodiment of FIG. 1, the input unit 61 and communication unit 63 are added as components. With the communication unit 63, the terminal 60 can access an external server 64 to download (e.g. new or unprogramed) applications 66. A method based on, for example, OSGi (Open Services Gateway Initiative) may be used for the download.

The speech recognition engine 67 and control unit 65 may be configured as execution programs executed in the terminal 60. In this case, when these execution programs have been improved, the improved versions may be easily downloaded via the communication unit 63, and may replace the outdated ones, so that the terminal 60 is updated.

Through such a procedure, the user may be advantageously enabled to download and use a new or improved application 66 produced after the user purchases the terminal, and/or a new improved speech recognition engine 67. With such an update function, the user may advantageously not need to purchase terminals frequently.

The downloaded application 66 may preferably include global command information, so that, like the previously installed applications 66, the downloaded application 66 may be operated by speech interaction.

Figure 7:
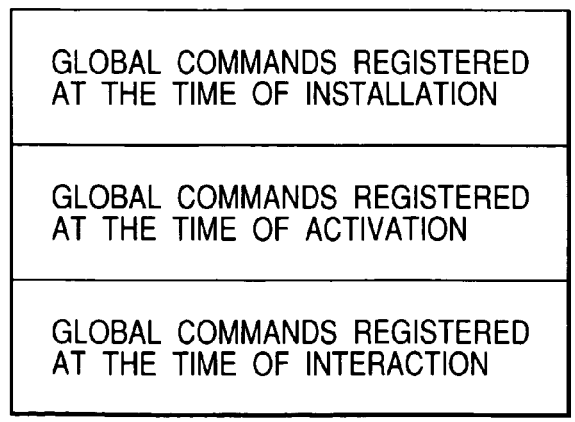
FIG. 7 explains one example embodiment of classification of global commands.

In this case, for example, as shown in FIG. 7, the global command information may be classified according to the states of the applications 15, and stored, for example, in information headers of the application programs.

Figure 8:
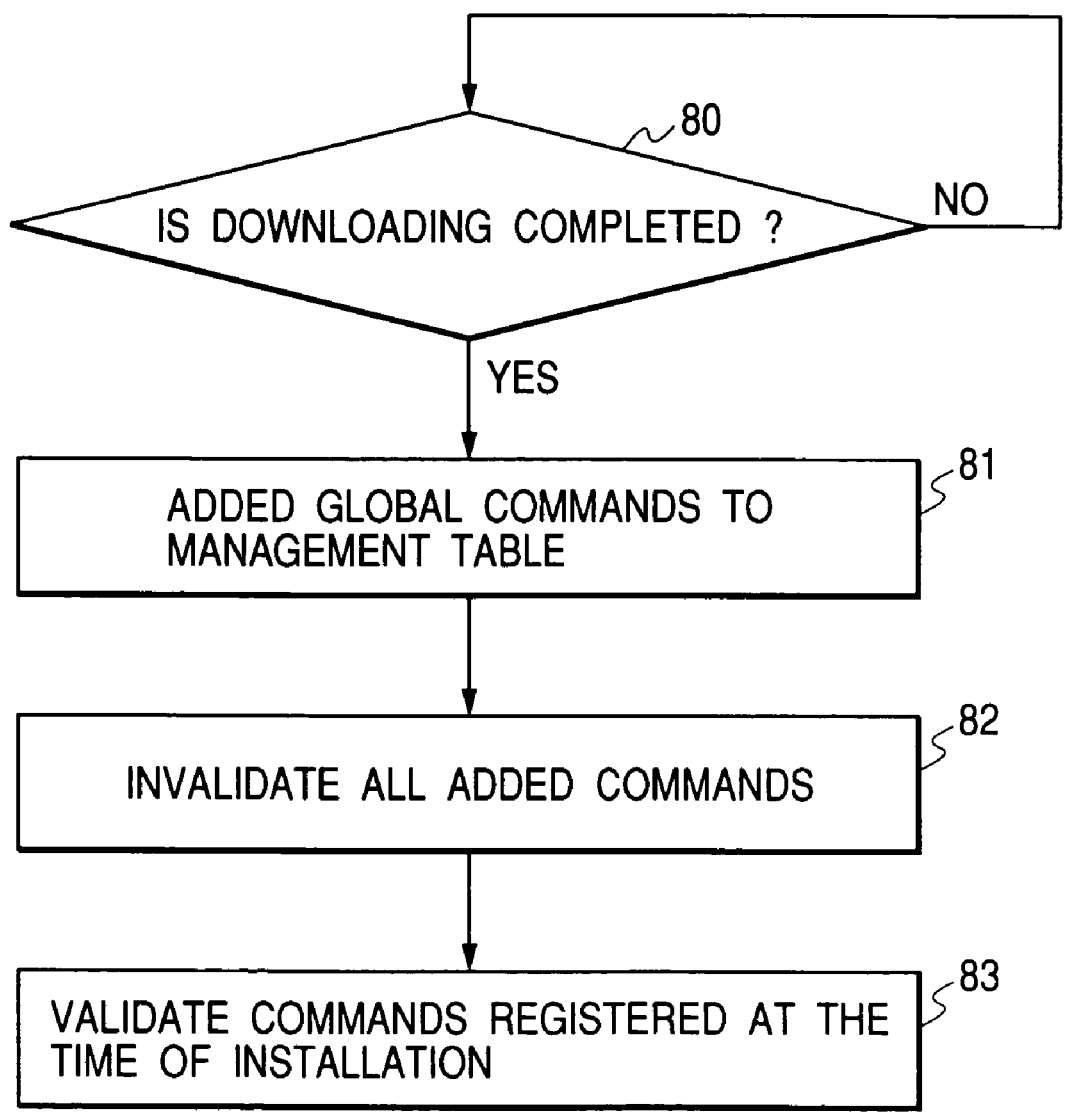
FIG. 8 is an example flowchart explaining one example embodiment of the process when an application is downloaded.

FIG. 8 is one example of a process flow of the terminal when the application 66 is downloaded. The control unit 65 may monitor whether an application 66 is being downloaded through communication 63 (80). For example, download may be executed from a server according to the user's request instruction via input unit 61 of the terminal, or automatically executed from the server.

When the application 66 is downloaded, the global command information contained in the application 66 may be added to a management table as shown in FIG. 2 (81). Because the global command information contained in the application 66 may not include information on whether each global command is valid or invalid, the management table may be so rewritten that all the added global commands are initially designated invalid (82). After that, the management table may be selectively rewritten so that global commands may be classified into ones registered at the time of installation so as to become valid (83).

The storing of the global commands, which are for at the time of activation and at the time of interaction, in the record unit 62 may be done when the application is downloaded through above-described operations. And these global commands may be flagged to be recognizable when the application 66 reports a change of its state to the control unit 65.

Figure 16:
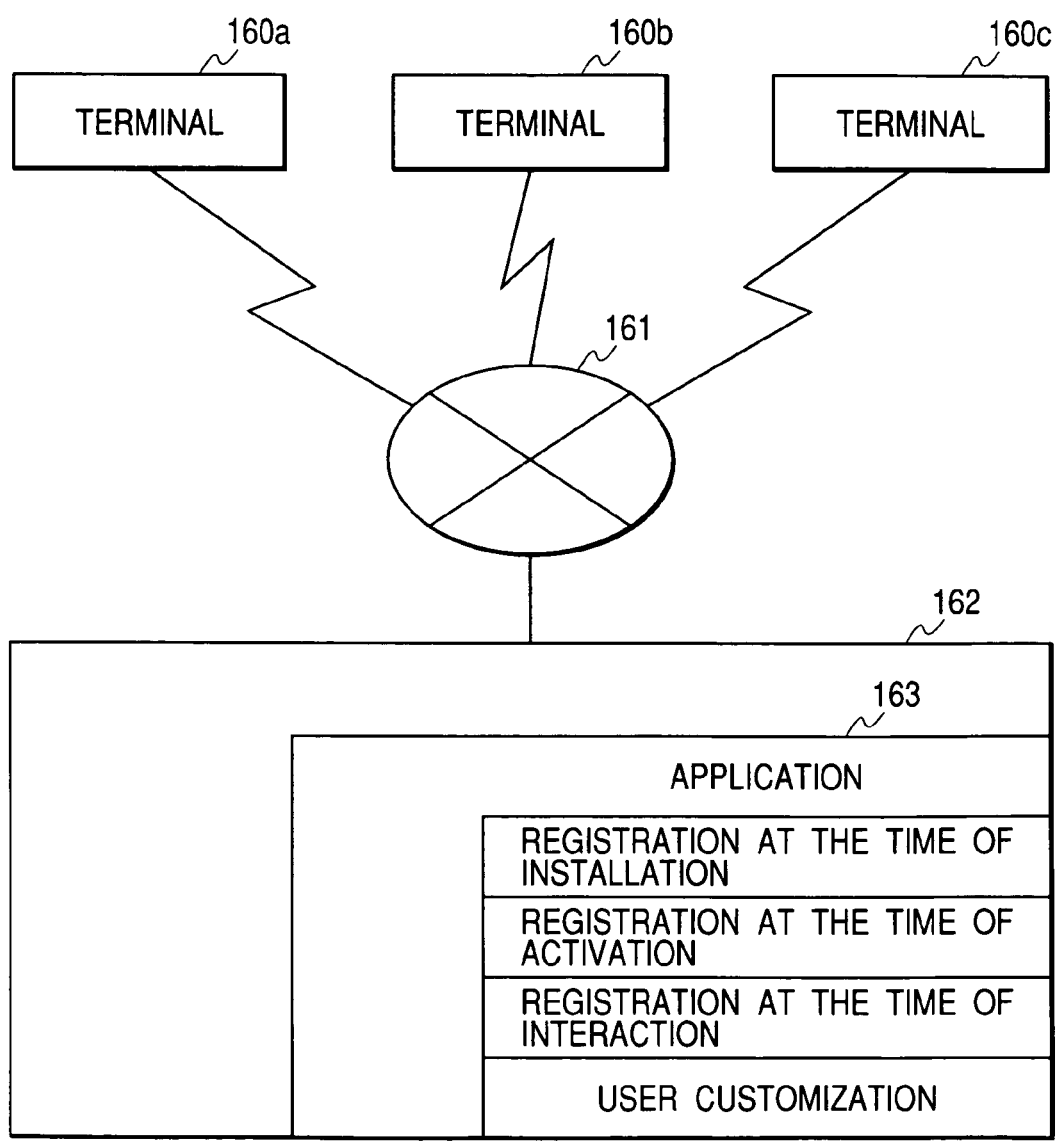
FIG. 16 is a example block diagram explaining one example embodiment of a method for providing a speech interaction application.

FIG. 16 is an example of a system configuration for providing a speech interaction application that executes the above-described example embodiment. A plurality of terminals 160(*a,b,c*) are connected to a server 162 over a network 161. In the server 162, a speech interaction application 163 may be recorded in, for example, a HDD device. As explained in FIG. 5, the speech interaction application 163 may be related to the global commands classified according to the states of the applications, which global commands may be also recorded in, for example, a HDD device. When any terminal 160 requests a download of the speech interaction application 163 over the network 161, the server 162 may transmit, to the terminal 160, the speech interaction application 163 and the global commands related thereto.

Next, an example embodiment of editing of global commands is explained. A function of an application to be used may differ according to its user, so that the commands to be used may depend on the user. When there is a command hardly used by the user in the commands registered at the time of activation, the user may desire to explicitly remove it from the commands to be recognized. Thereby decreasing the possibility of conflict and malfunction of the system.

Figures 9, 10:
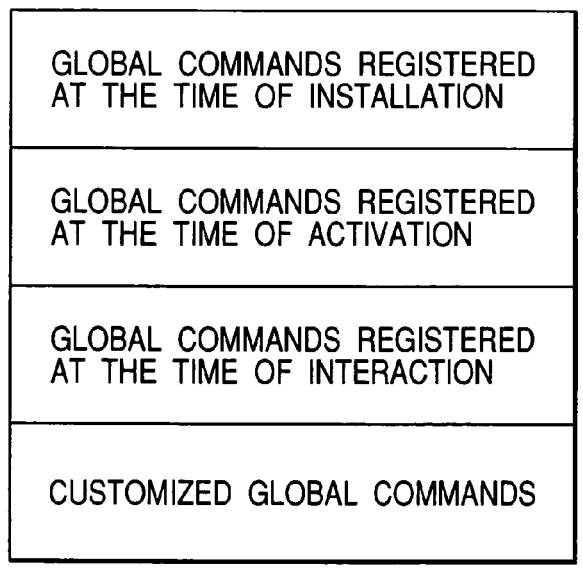
FIG. 9 explains another example embodiment of classification of global commands.
FIG. 10 explains one example embodiment of an example global command management table which can be customized by a user.

When the commands frequently used by only a few users are blindly classified into commands registered at the time of activation from the beginning, the number of the commands may become unnecessary excessive (i.e. over-comprehensive), decreasing the recognition ratio. In this case, a class for user-customized global commands may be provided. The commands of this class may be assumed not to be recognized according to the states of the application 66 in a default state, but to be explicitly set by the user as commands to be recognized. With the input unit 61, the user may edit a management table, as shown in FIG. 10, recorded in the memory 62 to decide whether each global command is to be recognized. A remote controller, a touch panel, and so on may be used as the input unit 61.

Figure 11A:
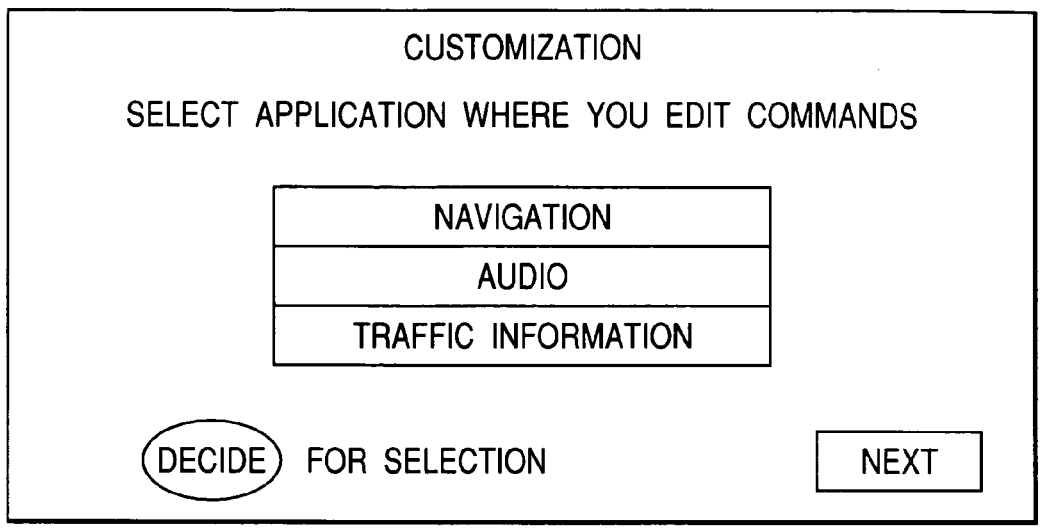
FIGS. 11A and 11B explain one example embodiment of a screen for editing global commands.
Figure 11B:
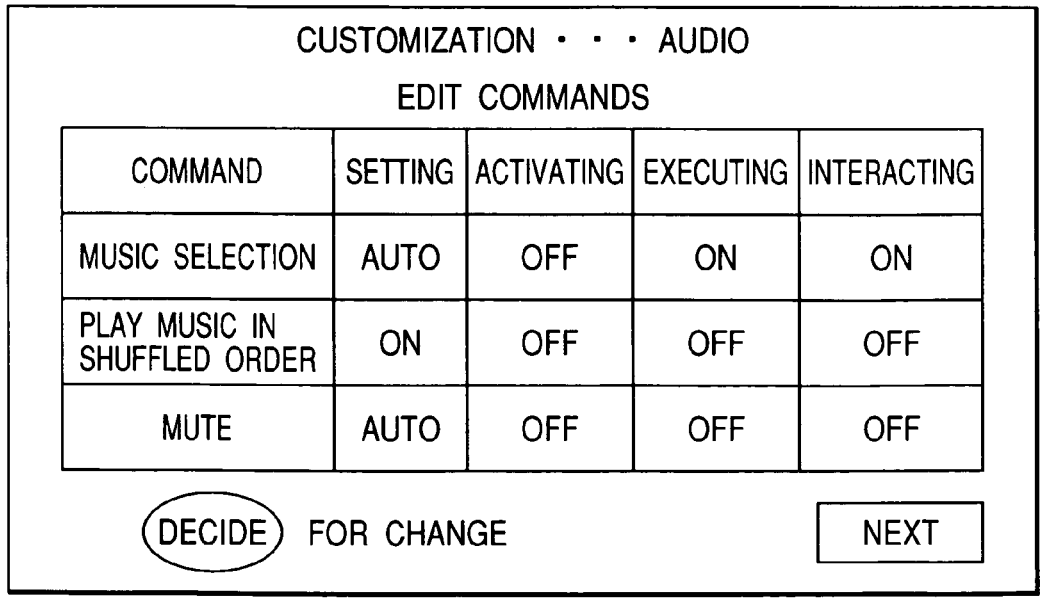

FIG. 11 shows one example of a display screen of the terminal when the user edits global commands. On a screen (FIG. 11(A)) for editing global commands, the user may select, by use of, for example, an up-and-down button of a remote controller, the application 66 whose global commands are to be edited, and may press a decision button to display a list of the global commands corresponding to the selected application 66 (FIG. 11(B)). Then the user may select a global command to be edited from the editable global commands by use of, for example, an up-and-down button of a remote controller, and press a decision button, whereupon "AUTO", "ON", and "OFF" may be switched in the "setting" field.

When the global command is set as "AUTO", the global command may become valid or invalid according to information on "ON/OFF" corresponding to each state; e.g. "activating", "executing", and "interacting" of a screen of FIG. 11. This is a default state. On the other hand, when the field "setting" is set as "ON", the global command may be always valid regardless of the state of the application 66. When the field "setting" is set as "OFF", the global command may be always invalid regardless of the state of the application 66.

Figure 12:
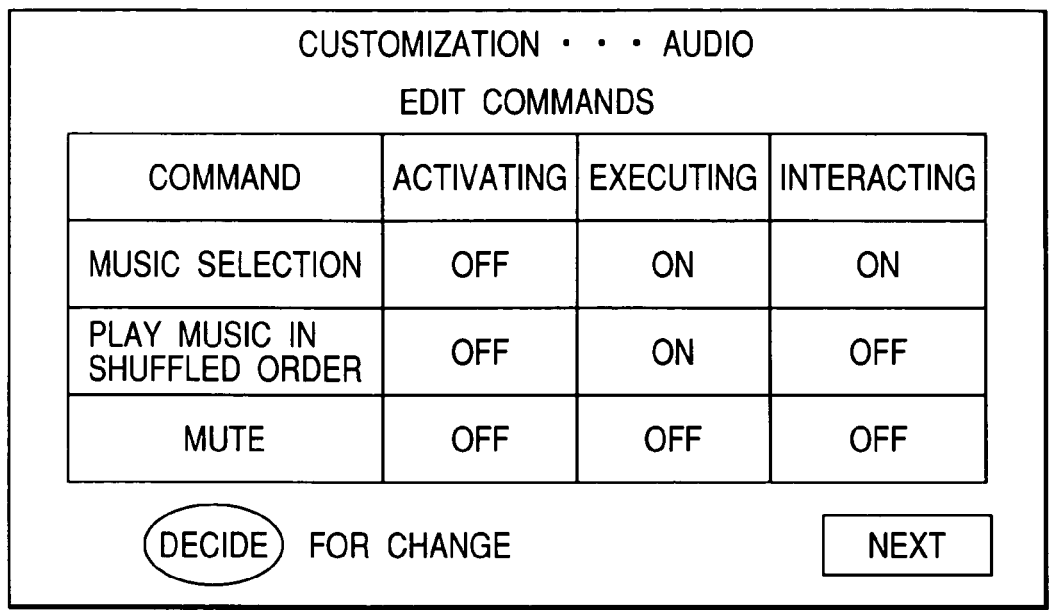
FIG. 12 explains another example embodiment of a screen for editing global commands.

In the above example, regardless of the state of the application 66, the validity of the global command which is set as "ON" or "OFF" by the user may be fixed. A flag corresponding to each state of the application may be changed using an interactive screen such as shown in FIG. 12. User may rewrite the "state" field of the management table as shown in FIG. 2, so that the user may decide the validity of a grammar for the states of the application. Additionally, a new command may be added and set. This achieves a customized terminal which reflects the user's taste.

FIG. 13 shows another example embodiment of the interaction type terminal. A terminal 130 may have a configuration where an input unit 132 and monitor unit 134 are added to the terminal 10 of FIG. 1. The input unit 132, which takes a form of, for example, a switch equipped to a steering, reports that the user desires to interact with a system.

When the user starts to interact with a system, it may be efficient that the start of the interaction is reported to the system by use of some input. Because the user may not have knowledge about global commands, the system may provide a guidance to prompt the interaction when there is an input for the start of the interaction. In this case, the number of applications to start the interaction may be preferably fixed to one according to the situation, and may be, for example, an application which is in the state of "interacting".

The control unit 131, according to an input from the input unit 132, may instruct the application in the state of "interacting" such as an application 133*a* to start to interact with the user. After receiving the instruction, the application 133*a* may start the interaction, for example, by outputting a guidance prompting the user to speak.

On the other hand, a user already accustomed to the system may desire quick handling of global commands by skipping the guidance of the system. To skip the guidance, a speech for the global command may be detected. As a more reliable method, the user may give an input for skipping the guidance to the system, so that the guidance may stop, and a state for waiting a speech inputted by the user appear, increasing a satisfaction level of the user accustomed to the system. The input for skipping the guidance may be inputted, for example, through the input unit 132, shown in FIG. 13, which reports the start of interaction to the system. A different input unit may be provided. Two switches may be equipped to a steering wheel, for example, where one is used as the input unit 132 and another is used as the different input unit.

This configuration may achieve a reliable process to avoid the possibility that a speech input may cause a malfunction, in an environment having a high noise level, e.g., such as in a running automobile.

When the user speaks a global command to operate an application 133*b* other than the currently-interacting application 133*a*, the interaction may not always need to be transferred to the application 133*b*. When the application 133*b* executes the user-desired operation, it may be better to continue the interaction with the application 133*a*. To response to such a situation, the applications 133 may have information on whether to start to interact with the user after executing a process corresponding to a command. In the present invention, information for achieving the above procedure, in other words, information on priority for determining whether the interaction is transferred to the application that has received a command instruction is called a priority level.

Concretely, as shown in the example of FIG. 15, a table where priority level information is added to the table of FIG. 14 may be contained on each application. After a function corresponding to a global command spoken by the user is executed, it may be decided whether to interact with the user according to the priority level information.

For example, it is assumed that the application 133*b* managing commands shown in FIG. 15 is in the activated state, and that the command "VOLUME UP" is registered as a global command of the application 133*b* and is valid. In this situation, when the command "VOLUME UP" is spoken, the control unit 131 may instruct the application 133*b* corresponding to the command "VOLUME UP" to execute the command "VOLUME UP". The application 133*b*, referring to the table of FIG. 15, may execute an operation for turning up the volume by one step, which operation corresponds to the command "VOLUMEUP".

In this process, the application 133*b* may refer to the information on the priority level. In this case, the priority level is low, so that the application 133*b* continues the "activated" state, and does not interact with the user. Therefore, when the user reports the start of the interaction again by use of the input unit 132, the application 133*a* may start to interact with the user.

On the other hand, in the above situation, when the command "SELECT" is spoken, the application 133*b* may refer to the priority level information. The priority level of the command "SELECT" is high, a state of the application may transfer to "interacting", and the control unit 131 receives the change of the state. Additionally, the application 133*b* may execute a process "DIALOG (SELECT)". In this example, it is assumed that the interaction with the user is done for selecting a name of a tune.

In this example, the information on the states of the applications 133 and the information on the priority levels may be recorded in the table, which is to be referenced. These pieces of information may change over time according to usage of the user. For example, when the present terminal is a car navigation system, the table may not be referenced. Instead, when necessary, it may be instantaneously decided which application 133 enters the "interacting" state and whether to interact after a command is spoken according to, for example, information on the running state.

Figure 17:
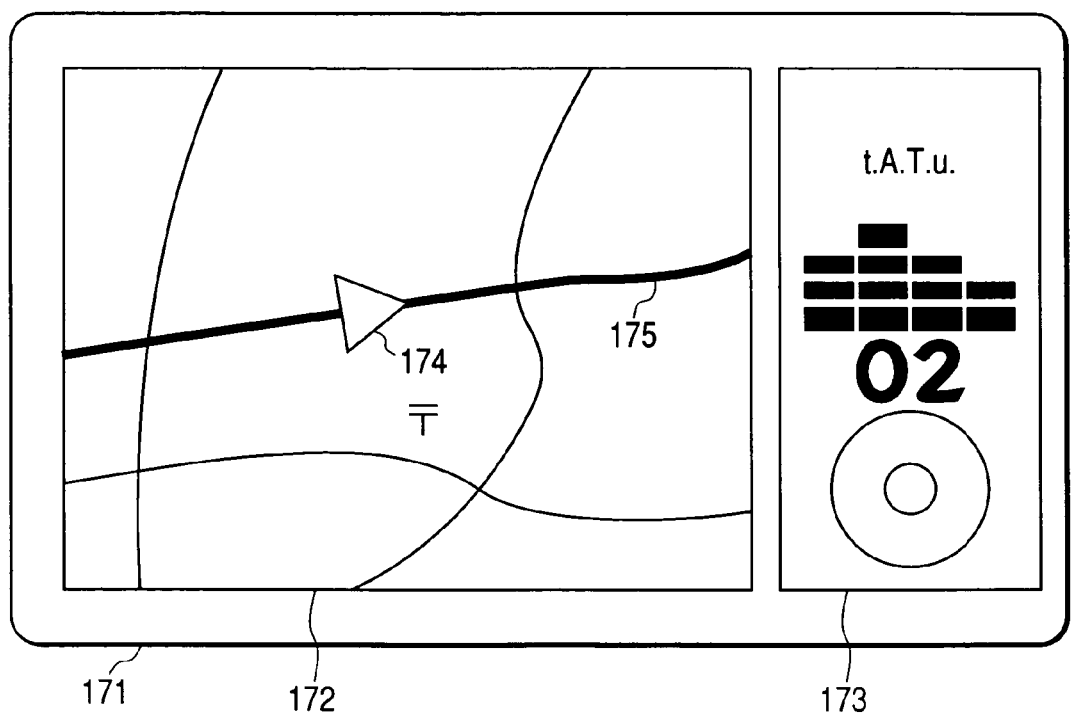
FIG. 17 explains an example embodiment of a screen display of a car navigation system.

Referring to FIG. 17, an embodiment when the present invention is applied to a car navigation system, which is an in-vehicle terminal, is explained. A car navigation system such as shown in FIG. 17 includes a display unit 171. And as a car navigation system, any example of the example embodiment terminals shown in this specification may be applied. It is obvious that in addition to the elements shown in each terminal system, a car navigation may have its own-car location obtaining unit and memory storing map information therein or other devices connected via network.

As shown in FIG. 17, the screen may be divided into two areas, one being a navigation screen 172, and another being a CD play screen 173. By using, for example, the OSGi platform, the car navigation system may execute simultaneously a plurality of applications. Each application may be displayed on the display area assigned thereto, so that the screen as shown in FIG. 17 is configured in a predetermined manner. In this example, a "navigation application" and "music application" are displayed on the screen.

Each application may not need to be always assigned a display area. For example, normally, an application for monitoring occurrence of accidents may not need to be displayed on the screen, so that the application may not be displayed on the screen.

In the example embodiment of a navigation screen displayed on the screen 172, an own-car location icon 174 may be displayed on a route according to information obtained by own car location obtaining unit. Map information may be recorded on the terminal or obtained by accessing a server. This navigation application, which can interact using speech, may set a destination, for example, in response to an input of a command "setting destination", search a route from own car location to the destination in response to a command "search route", and display route information 175 on the map.

FIG. 18 is a list of example global commands that may be received by the car navigation system in the state of FIG. 17. In addition to the two applications displayed on the screens, this system has obtained a "traffic information application", so that a command corresponding to the "traffic information application" may also be managed. For example, when the application is downloaded from the server by use of the OSGi platform, a global command may be registered as a command for activating the application when the application is installed. This achieves that an application not displayed on the screen may be executed by calling it directly by use of a speech command, instead of calling the menu using a remote controller, a touch panel, and so on.

In a car navigation system having a fixed menu configuration, an application may be called while the user is driving the car by use of the remote controller by memorizing a location relationship of the menu. In a car navigation system where an application can be added, the menu configuration may change, so that the screen needs to be seen when operating the system with the remote controller. Safety operations while the user is driving the car may be achieved in the car navigation system where the menu configuration changes are able to be made by making speech input of commands.

In the command list example shown in FIG. 18, the number of global commands listed as navigation applications is greater than that of music applications, and only one global command of a traffic information application is provided. This is because each application includes global command lists 191 to 193 as shown in FIG. 19, and receivable commands may switch according to a state of each application. In this example, the navigation application is in the "interacting"

state, the music application is in the "activated" state, and the traffic information application is in the "installed" state. Therefore, many commands for route guidance, such as "setting destination" and "scale up (screen)", may have the possibility to be spoken by the user are managed, and only a command to be spoken by the user to activate the traffic information application not currently activated is managed.

Figure 20:
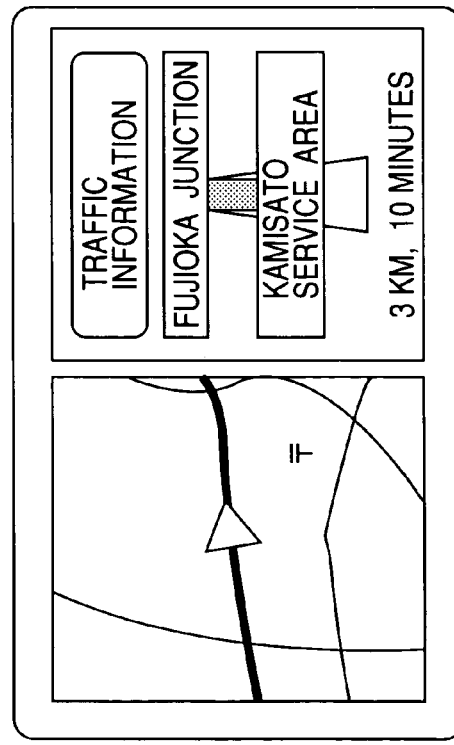
FIG. 20 explains one example embodiment of a change of the global command list when an application changes its state.

FIG. 20 is an example of a screen 201 displayed when the user has spoken "activate traffic information application" in the state of FIG. 18, and of a list 202 of the global commands receivable in this activated state. When the traffic information application enters an "interacting" state at the same time as its activation, the navigation application may transfer from "interacting" state to "activated" state. Then a group of the global commands as shown in FIG. 20 may become receivable.

The applications may not need to automatically enter the "interacting" state when activated, but may transfer to the "activated" state. For example, during the procedure from FIG. 18 to FIG. 20, there is a change that the traffic information application is displayed on the screen. It is possible that the traffic information application may transfer to the "activated" state and the navigation application may continue to be in the "interacting" state. This is because an operation to be next executed by the user according to information obtained from the traffic information application may be predicted as one to be executed by the navigation application, such as renewed search for routes and search for bypasses. So the traffic information application having small possibility to interact with the user transfers to the "activated" state and the navigation application continues in an "interacting" state, increasing the handling of the user.

Generally, the application whose main purpose is to unilaterally provide information to the user and which does not interact with the user may transfer to the "activated" state, instead of the "interacting" state, even when called by the user by use of the global command, so that the user may naturally return to the flow of the interaction before calling the application.

According to the present invention, in a car navigation system where many applications simultaneously exist, an optimum global command may become valid according to a state of each application, e.g., to decrease the wrong recognition ratio, avoid the malfunctions, and execute a plurality of the applications by use of one speech, achieving a convenient user interface.

As mentioned above a feature of the present invention is to provide a user-friendly interaction type user interface unit for increasing a recognition ratio in the above-described systems where many speech interaction applications are managed.

IN conclusion one example outline of the present invention disclosed herein to solve the above-described problems is as follows.

A terminal of the present invention includes, at least, a control unit for controlling a plurality of applications, a speech input unit, a speech recognition engine for recognizing an input via the speech input unit, and a record unit for recording global commands which achieve interaction with a plurality of the applications other than an application currently interacting with a user. The control unit, when results of the speech recognition match the global commands, executes applications corresponding to the global commands, and manages the global commands in response to a state of each of the applications to solve the above-described problems.

In concluding, reference in the specification to "one embodiment", "an embodiment", "example embodiment", etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment or component, it is submitted that it is within the purview of one skilled in the art to effect such feature, structure, or characteristic in connection with other ones of the embodiments and/or components. Furthermore, for ease of understanding, certain method procedures may have been delineated as separate procedures; however, these separately delineated procedures should not be construed as necessarily order dependent in their performance, i.e., some procedures may be able to be performed in an alternative ordering, simultaneously, etc.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A terminal comprising:
   a control unit for controlling a plurality of speech interaction application programs;
   a speech input unit;
   a speech recognition engine for recognizing a speech input via the speech input unit; and
   a memory for storing a dictionary that has words that the speech recognition engine can recognize;
   wherein:
   each speech interaction application program has a group of words for speech recognition, with each word designated as either a local command useable as a recognition word only when the user is interacting with the application program, or a global command settable selectively as a recognition word relative to whether the user both is/isn't interacting with the application program,
   the dictionary has the words which are local commands of a current-interacting application program, and the words which are global commands of the current-interacting application program and a not-current-interacting application program,
   the control unit selectively sets each word of global commands in the dictionary as recognizable or unrecognizable within a recognition process of speech recognition, according to operation states of the application program which said each word is tied to,
   the speech recognition engine searches and outputs one or more words as recognition results that have high match likelihood, after comparing the speech input via the speech input unit with: the words in the dictionary which are a said local command of the current-interacting application program, and the words which are a said global command that were set as recognizable by the control unit, and
   the control unit executes: the process for the current-interacting application program that was tied to the recognized local command word, if the recognition result is a said local command of the current-interacting application program, or executes the process that was tied to the recognized global command word if the recognition result is a global command.

2. The terminal of claim 1 comprising a communication unit connectable to at least one of an external server and network, wherein the control unit records the commands into the memory when the speech interaction application programs corresponding to the commands are obtained via the communication unit.

3. The terminal of claim 1, wherein the control unit starts to interact with the speech interaction application programs in response to inputs from an input unit.

4. The terminal of claim 1, wherein the control unit stops speech recognition processes in response to inputs from an input unit, and makes the speech interaction application programs enter a speech wait state.

5. The terminal of claim 1, wherein the control unit manages different commands according to whether the currently-interacting application program and the speech interaction application programs other than the currently-interacting application programs, are in an installed state, activated state, or interacting state.

6. The terminal of claim 5, wherein, when a result of speech recognition does not match the global commands, the speech recognition is processed as an input into the currently-interacting application program.

7. The terminal of claim 5, wherein the speech interaction application programs include information on priority, and the control unit judges whether to start to interact with one of the speech interaction application programs which correspond to an input said global command according to the priority when the global commands are inputted to the control unit via the input unit.

8. The terminal of claim 1, wherein the global commands achieve interaction with at least one of the plurality of speech interaction application programs other than the currently-interacting application program.

9. The terminal of claim 8, wherein the control unit manages different global commands according to whether the currently-interacting application program and the speech interaction application programs other than the currently-interacting application program, are in an installed state, activated state, or interacting state.

10. The terminal of claim 8 comprising an input section, wherein the control section adds, deletes, or changes the commands according to inputs via the input section.

11. The terminal of claim 8 comprising a communication unit connectable to at least one of an external server and network, wherein the control unit records global commands into the memory when the speech interaction application programs corresponding to the global commands are obtained via the communication unit.

12. The terminal of claim 8, wherein, when a result of speech recognition does not match the global commands, the speech recognition is processed as an input into the currently-interacting application program.

13. The terminal of claim 8, wherein the speech interaction application programs include information on priority, and the control unit judges whether to start to interact with one of the speech interaction application programs which correspond to an input said global command according to the priority when the global commands are inputted to the control unit via the input unit.

14. The terminal of claim 8, wherein the control unit starts to interact with the speech interaction application programs in response to inputs from an input unit.

15. The terminal of claim 8, wherein the control unit stops speech recognition processes in response to inputs from an input unit, and makes the speech interaction application programs enter a speech wait state.

16. A speech interaction application provision method for providing a plurality of speech interaction application programs recorded in memory, comprising:
controlling the plurality of speech interaction application programs via a control unit;
inputting a speech via a speech input unit;
recognizing a speech input via the speech input unit via a speech recognition engine; and
storing a dictionary that has words that the speech recognition engine can recognize, within a memory;
wherein:
each speech interaction application program has a group of words for speech recognition, with each word designated as either a local command useable as a recognition word only when the user is interacting with the application program, or a global command settable selectively as a recognition word relative to whether the user both is/isn't interacting with the application program,
the dictionary has the words which are local commands of a current-interacting application program, and the words which are global commands of the current-interacting application program and a not-current-interacting application program,
the control unit selectively sets each word of global commands in the dictionary as recognizable or unrecognizable within a recognition process of speech recognition, according to operation states of the application program which said each word is tied to,
the speech recognition engine searches and outputs one or more words as recognition results that have high match likelihood, after comparing the speech input via the speech input unit with: the words in the dictionary which are a said local command of the current-interacting application program, and the words which are a said global command that were set as recognizable by the control unit, and
the control unit executes: the process for the current-interacting application program that was tied to the recognized local command word, if the recognition result is a said local command of the current-interacting application program, or executes the process that was tied to the recognized global command word if the recognition result is a global command.

17. A speech interaction application provision method of claim 16, wherein the different global commands are managed according to whether a currently-interacting application program and speech interaction application programs other than the currently-interacting application program, are in an installed state, activated state, or interacting state.

18. A terminal comprising:
record means for recording a plurality of speech interaction application programs;
speech input means;
speech recognition means for recognizing a speech input from the speech input means;
memory means for storing a dictionary means that has words that the speech recognition means can recognize; and
control means for controlling the plurality of speech interaction application programs;
wherein:
each speech interaction application program has a group of words for speech recognition, with each word designated as either a local command useable as a recognition word only when the user is interacting with the application program, or a global command settable selectively as a recognition word relative to whether the user both is/isn't interacting with the application program, the dictionary means has the words which are local commands of a current-interacting application program, and the words which are global commands of the current-interacting application program and a not-current-interacting application program, the control means selectively sets each word of global commands in the dictionary means as recognizable or unrecognizable within a recognition process of speech recognition, according to operation states of the application program which said each word is tied to, the speech recognition means searches and outputs one or more words as recognition results that have high match likelihood, after comparing the speech input via the speech input unit with: the words in the dictionary means which are a said local command of the current-interacting application program, and the words which are a said global command that were set as recognizable by the control unit, and the control means executes: the process for the current-interacting application program that was tied to the recognized local command word, if the recognition result is a said local command of the current-interacting application program, or executes the process that was tied to the recognized global command word if the recognition result is a global command.

19. An in-vehicle terminal comprising:

a record unit for recording a plurality of speech interaction application programs which include at least a route guide application;

a control unit for controlling the plurality of speech interaction application programs;

a vehicle location obtaining unit;

a speech input unit;

a speech recognition unit for recording a speech input from the speech input unit;

a memory for recording dictionary that have words that the speech recognition engine can recognize; and a display unit for displaying at least a vehicle location acquired by the vehicle location obtaining unit and the route calculated by the route guide application;

wherein:

each speech interaction application program has a group of words for speech recognition, with each word designated as either a local command useable as a recognition word only when the user is interacting with the application program, or a global command settable selectively as a recognition word relative to whether the user both is/isn't interacting with the application program, the dictionary has the words which are local commands of a current-interacting application program, and the words which are global commands of the current-interacting application program and a not-current-interacting application program, the control unit selectively sets each word of global commands in the dictionary as recognizable or unrecognizable within a recognition process of speech recognition, according to operation states of the application program which said each word is tied to, the speech recognition engine searches and outputs one or more words as recognition results that have high match likelihood, after comparing the speech input via the speech input unit with: the words in the dictionary which are a said local command of the current-interacting application program, and the words which are a said global command that were set as recognizable by the control unit, and the control unit executes: the process for the current-interacting application program that was tied to the recognized local command word, if the recognition result is a said local command of the current-interacting application program, or executes the process that was tied to the recognized global command word if the recognition result is a global command.

20. An in-vehicle terminal of claim 19, wherein the managing unit manages different global commands according to whether the currently-interacting application program and speech interaction application programs other than the currently-interacting application program, are in an installed state, activated state, or interacting state.

* * * * *